Patented Mar. 24, 1931

1,797,760

UNITED STATES PATENT OFFICE

CHARLES DE ROHDEN, OF BALTIMORE, MARYLAND, ASSIGNOR TO COMMERCIAL PIGMENTS CORPORATION, OF NEW YORK, N. Y., A CORPORATION OF DELAWARE

PRODUCTION OF TITANIUM COMPOSITIONS

No Drawing.  Application filed February 10, 1928. Serial No. 253,530.

My invention pertains to the production of colloidal titanium dioxide and relates more specifically to the peptization of titanium dioxide in ammoniacal solutions and to the products thus obtained.

As Blumenfeld has shown in his U. S. Patent 1,504,673, it is possible to produce an aqueous colloidal dispersion of titanium dioxide, precipitated by hydrolysis, by adding a small quantity of hydrochloric acid to the wet filter-cake of $TiO_2$ which has previously been treated to remove traces of adsorbed sulfuric acid.

My present invention relates to the peptization of $TiO_2$ by dilute ammonia. I have discovered, also, that this process is applicable to $TiO_2$, other than that freshly precipitated.

An aqueous colloidal dispersion of $TiO_2$ peptized by ammonia is a fluid, unfiltrable, milk-white colloidal solution showing the blue tinge that is characteristic of such colloids. Such solutions may be obtained in concentrations as high as 550 grams per liter and may be diluted to any desired degree without destroying the colloidal dispersion. The dispersion may be coagulated by the addition of sufficient acid to neutralize the contained ammonia.

Ordinary $TiO_2$ produced by the hydrolysis of titanium sulfate solutions may be peptized in the following manner. The precipitated $TiO_2$ is washed to remove mother liquor and is treated with an alkaline solution such as ammonia or sodium carbonate, to neutralize the adsorbed sulfuric acid. The mass is then thoroughly washed to remove salts. To 1 kilogram of $TiO_2$ in the form of a wet washed filter-cake containing about 60% of water, there is added about 140 grams of aqua ammonia (35%). This addition causes the mass to become fluid and peptization occurs, an unfiltrable colloidal suspension resulting. To secure the peptization of the entire amount of $TiO_2$, it is sometimes, though not always, necessary to heat the mixture.

In this manner, a peptized solution containing as much as 500–550 grams per liter of $TiO_2$ may be produced. It is not necessary to use concentrated aqua ammonia for the peptization process. A more dilute solution will serve as well. In any event, the ammonia is diluted, as peptization occurs, by the large amount of water present in the filter cake. The peptized solution thus produced may be diluted to any desired degree with water. In general, the greater the dilution, the greater the stability of the colloidal dispersion.

I may also peptize a dry, previously calcined $TiO_2$ by the following procedure. An aqueous colloidal dispersion of $TiO_2$, in either hydrochloric acid or ammonia, is coagulated by the addition of alkali or a polybasic acid, as the case may be, and the resultant precipitate is filtered, washed, dried, and calcined for one-half hour at about 950° C. One kilogram of the calcined material is placed in a ball mill with a liter of water containing 10–20 grams of $NH_3$. The mixture is then ground for about 24 hours, after which the resultant paste is removed and diluted with 3–4 liters of water. In this manner, most of the $TiO_2$ treated may be peptized, and the peptized solution may be separated from the residual $TiO_2$ by decantation. Peptized solutions containing about 200 grams of $TiO_2$ per liter may thus be prepared.

Now, having described my invention, I claim the following as new and novel:

1. An aqueous colloidal dispersion of calcined titanium dioxide in a solution containing ammonia.

2. A process for the production of an aqueous colloidal dispersion of titanium dioxide which comprises grinding about one part of $TiO_2$ with about one part of a dilute solution of ammonium hydroxide.

3. A process for the production of an aqueous colloidal dispersion of titanium dioxide which comprises grinding about one part of $TiO_2$ with about one part of a dilute solution of ammonium hydroxide, adding water to the paste so produced, and separating the resultant peptized solution from the residual $TiO_2$.

4. A process for the production of an aqueous solution containing highly dispersed titanium dioxide, comprising grinding about one part of titanium dioxide, which has been coagulated from an aqueous colloidal dispersion, with about one part by weight of a dilute solution of ammonia, and adding water to the resultant paste.

5. A process for the production of an aqueous solution containing highly dispersed titanium dioxide, which comprises grinding about one part of titanium dioxide, which has been calcined after coagulation from an aqueous colloidal dispersion thereof, with about one part by weight of a dilute solution of ammonia, and adding water to the resultant paste.

6. A process for the production of an aqueous solution containing highly dispersed titanium dioxide, comprising coagulating an aqueous colloidal dispersion of titanium dioxide in hydrochloric acid by adding an alkali, filtering and calcining the coagulated precipitate, grinding about one part by weight of the calcined material with one part of a solution containing about 1 to 2% of dissolved ammonia, and adding about three to four parts of water to the resultant paste.

7. A process for the production of an aqueous solution containing highly dispersed titanium dioxide, which comprises grinding calcined titanium dioxide with a dilute solution of ammonia.

8. A process for the production of an aqueous solution containing highly dispersed titanium dioxide, which comprises grinding calcined titanium dioxide which has been coagulated from an aqueous colloidal dispersion, with a dilute solution of ammonia.

9. A process for the production of an aqueous solution containing highly dispersed titanium dioxide, comprising coagulating an aqueous colloidal dispersion of titanium dioxide in hydrochloric acid by adding an alkali, calcining the coagulated precipitate, and grinding the calcined material with a dilute solution of ammonia.

10. An aqueous dispersion containing about 100 to 200 grams of calcined titanium dioxide and a trace of ammonia per liter.

CHARLES DE ROHDEN.